(12) United States Patent
Schuman et al.

(10) Patent No.: US 7,820,318 B2
(45) Date of Patent: Oct. 26, 2010

(54) UNIVERSAL BATTERY MOUNT

(75) Inventors: Adam Schuman, Secane, PA (US);
Michael Crane, Drexel Hill, PA (US);
Kevin Durkin, Clifton Heights, PA
(US); Jules Scogna, Drexel Hill, PA
(US); Joseph Troy, Aldan, PA (US);
Megan Durkin, Malvern, PA (US);
Elizabeth Hale, Drexel Hill, PA (US)

(73) Assignee: eStop Robotics LLC, Aldan, PA (US)

( * ) Notice: Subject to any disclaimer, the term of this patent is extended or adjusted under 35 U.S.C. 154(b) by 232 days.

(21) Appl. No.: 12/043,548

(22) Filed: Mar. 6, 2008

(65) Prior Publication Data

US 2008/0220322 A1    Sep. 11, 2008

Related U.S. Application Data

(60) Provisional application No. 60/905,192, filed on Mar. 6, 2007.

(51) Int. Cl.
*H01M 2/10*    (2006.01)

(52) U.S. Cl. ............... 429/96; 429/97; 429/98; 429/99; 429/100; 429/123; 429/151

(58) Field of Classification Search .......... 429/99, 429/175, 178–184, 97, 98, 100, 123, 151, 429/157, 160, 187
See application file for complete search history.

(56) References Cited

U.S. PATENT DOCUMENTS 4,943,498 A * 7/1990 Cooper et al. .............. 429/97
2002/0034683 A1* 3/2002 Takeshita et al. .......... 429/123

* cited by examiner

*Primary Examiner*—Patrick Ryan
*Assistant Examiner*—Ben Lewis
(74) *Attorney, Agent, or Firm*—Design IP; Joseph E. Maenner

(57) ABSTRACT

A battery mount is disclosed. The battery mount includes a body having a lateral axis, a central groove extending along the lateral axis, and an arcuate cut-out extending from a top surface of the body on either side of the lateral axis.

14 Claims, 5 Drawing Sheets

UNIVERSAL BATTERY MOUNT

CROSS-REFERENCE TO RELATED APPLICATION

The present application claims priority from U.S. Provisional Patent Application Ser. No. 60/905,192, filed on Mar. 6, 2007.

FIELD OF THE INVENTION

The present invention relates to a mounting device that may be used to secure different types of twelve volt batteries to a mounting surface.

BACKGROUND OF THE INVENTION

Twelve volt DC batteries are manufactured by numerous different manufacturers and have numerous different designs. Presently, a battery from a first manufacturer may be mounted onto a device which is operated by the battery, such as a robotic vehicle, in a particular configuration. In the event that the battery must be replaced, and a replacement twelve volt battery, manufactured by a different manufacturer, is used, the original mounting configuration may not accommodate the replacement battery, necessitating the removal of the original mounting configuration and the insertion of a new mounting configuration to accommodate the replacement battery.

There exists a need to provide a mounting system that may accommodate multiple different designs of twelve volt batteries without having to replace the mounting system.

SUMMARY OF THE INVENTION

Briefly, the present invention provides a battery mount comprising a body having a lateral axis, a central groove extending along the lateral axis, and an arcuate cut-out extending from a top surface of the body on either side of the lateral axis.

The present invention further provides a battery mount comprising a body having a longitudinal side and a longitudinal axis extending generally parallel to the longitudinal side, a central groove extending generally perpendicular to the longitudinal axis, and an arcuate cut-out extending from a top surface of the body between the longitudinal axis and the longitudinal side.

The present invention also provides a battery mount kit comprising a first battery mount comprising a body having a lateral axis, a central groove extending along the lateral axis, an arcuate cut-out extending from a top surface of the body on either side of the lateral axis, and a lateral groove extending parallel to and on either side of the central groove. A second battery mount comprises a body having a lateral axis, a central groove extending along the lateral axis, and an arcuate cut-out extending from a top surface of the body on either side of the lateral axis. The arcuate cut-out is juxtaposed away from the central groove.

BRIEF DESCRIPTION OF THE DRAWINGS

The forgoing summary, as well as the following detailed description of preferred embodiments of the invention, will be better understood when read in conjunction with the appended drawings, which are incorporated herein and constitute part of the specification. For the purposes of illustrating the invention, there are shown in the drawings an exemplary embodiment of the present invention. It should be understood, however, that the invention is not limited to the precise arrangements and instrumentalities shown. In the drawings, the same reference numbers are employed for designating the same elements throughout the several figures. In the drawings.

DETAILED DESCRIPTION OF THE INVENTION

Figure 1:
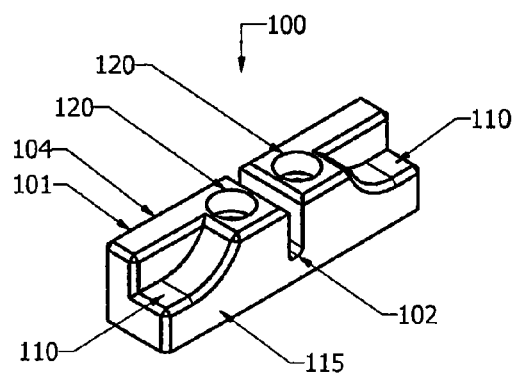
FIG. 1 is a perspective of the universal battery mount according to a first exemplary embodiment of the present invention.
Figure 2:
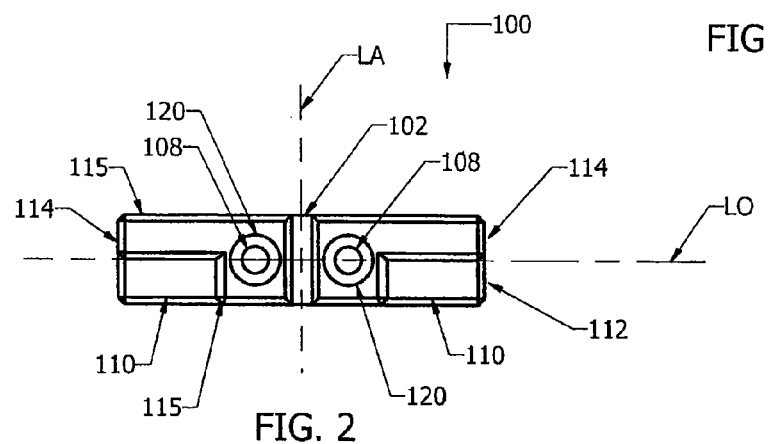
FIG. 2 is a top plan view of the battery mount of FIG. 1.
Figure 3:
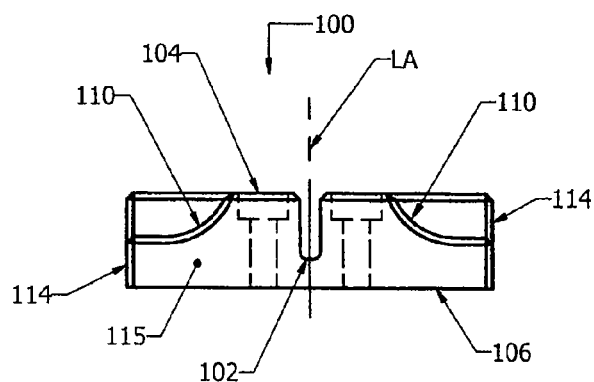
FIG. 3 is a front elevation view of the batter mount of FIG. 1.
Figure 4:
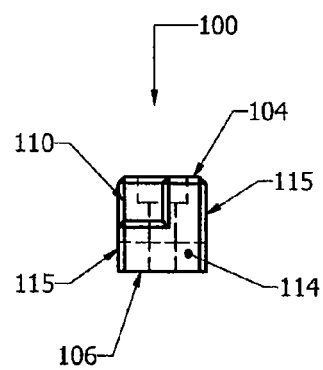
FIG. 4 is a side elevation view of the battery mount of FIG. 1.
Figure 5:
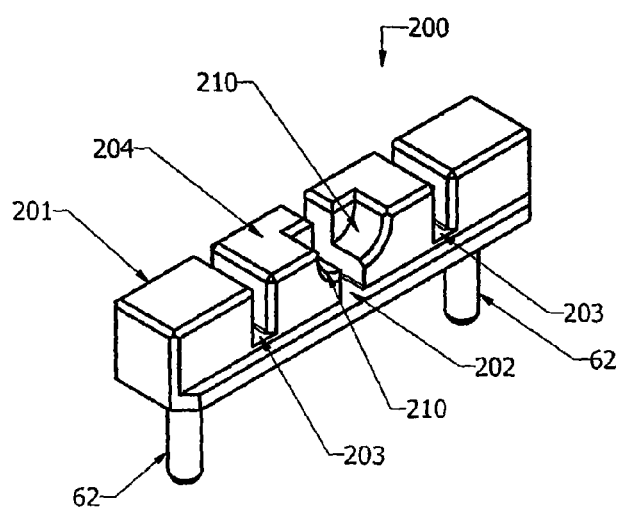
FIG. 5 is a perspective view of a universal battery mount according to a second exemplary embodiment of the present invention.
Figure 6:
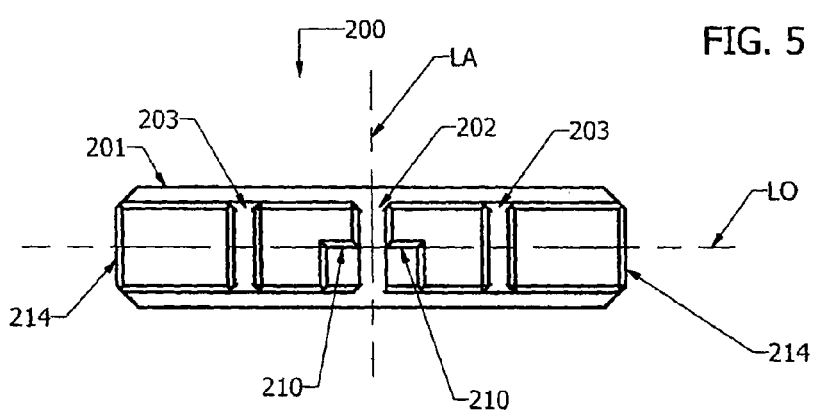
FIG. 6 is a top plan view of the battery mount of FIG. 5.
Figure 7:
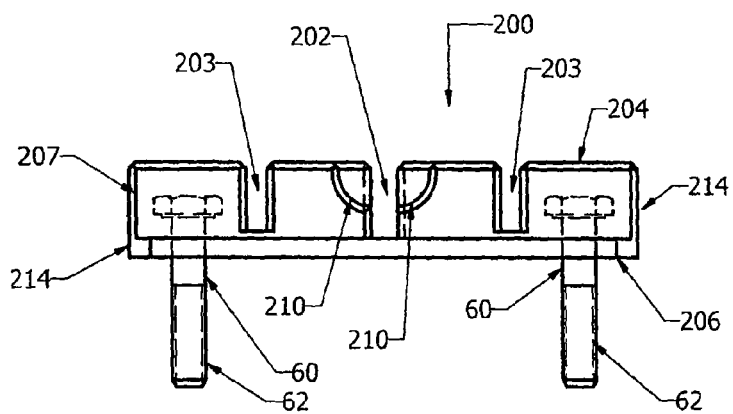
FIG. 7 is a side elevation view, partially in section, of the universal battery mount of FIG. 5.
Figure 8:
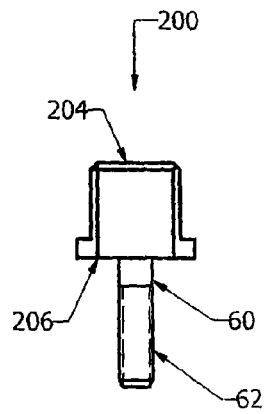
FIG. 8 is a side elevation view of the universal battery mount of FIG. 5.

Certain terminology is used herein for convenience only and is not to be taken as a limitation on the present invention. The terminology includes the words specifically mentioned, derivatives thereof and words of similar import. The following describes exemplary embodiments of the invention. However, it should be understood based on this disclosure, that the invention is not limited by the exemplary embodiments of the invention.

Referring generally to FIGS. 1-4, a universal battery mount 100 according to a first exemplary embodiment of the present invention is shown. Battery mount 100 may be used to mount several different types of twelve volt sealed lead acid batteries, such as manufactured by Exide (EX-18-1200), MK (ES17-12-MK and ES20-12C), K-Cell (Model 200188), ELK Batteries (12180), UB (12180), Dual lite (12542 and 12582), Rhino (SLA17-12), CSB Battery of America (EVX-12170), BB Battery (EB20-12 and EB50-12), and other types of batteries. Battery mount 100 may be constructed from a moldable or shapeable material, such as a polymer. In an exemplary embodiment, the polymer may be constructed from a polymer, such as smooth-cast ROTO®, manufactured by Reynolds Advanced Materials, located in Dallas, Tex. The polymer is a two part mixture or urethane (Part A) and catalyst (Part B), with equal amounts of Part A and Part B. A polyester fiber is added to the polymer, with the polyester fiber making up between about 0.4% and about 2.4% by weight of the composition. Exemplary fibers are approximately ⅛ inch long, 6.0 Denier.

Battery mount 100 has a generally rectangular hexahedron shaped body 101, with a lateral axis LA bisecting battery mount 100 into mirror images on either side of lateral axis LA, and a longitudinal axis LO that bisects battery mount 100 into two separate longitudinal portions. All edges of body 101 may be chamfered as shown in the drawings. A central groove 102 extends along lateral axis LA, generally perpendicular to longitudinal axis LO, and extends from a top surface 104 through battery mount 100, and ends prior to extending completely through body 101.

Battery mount 100 also includes an arcuate cut-out 110 on either side of lateral axis LA that extends on a first side 112 of longitudinal axis LO. Arcuate cut-out 110 allows battery mount 100 to be used both with batteries that require arcuate cut-out 110 in battery mount 100 in order to allow the battery mount 100 to be coupled to the battery, as well as batteries that do not require arcuate cut-out 110 in battery mount 100 in order to allow the battery mount 100 to be coupled to the battery.

Arcuate cut-out 110 begins at top surface 104 about halfway between groove 102 and a lateral surface 114 of battery mount 100. A pair of longitudinal surfaces 115 extends between lateral surfaces 114, generally parallel to longitudinal axis LO. Arcuate cut-out 110 extends about halfway from top surface 104 toward bottom surface 106 and is juxtaposed away from central groove 102.

Optionally, retaining bolt cut-outs 120 may be formed in body 101 on either side of groove 102, between groove 102 and arcuate cut-out 110. Retaining bolt cut-outs 120 extend from top surface 104, through body 101, to bottom surface 106, with a shoulder 108 to engage bolt head (not shown). Alternatively, instead of forming retaining bolt cut-outs 120 in body 101, bolts (not shown) may be molded into body 101 such that the threaded portion of the bolts extend outwardly from bottom surface 106 of body 101.

Figure 9:
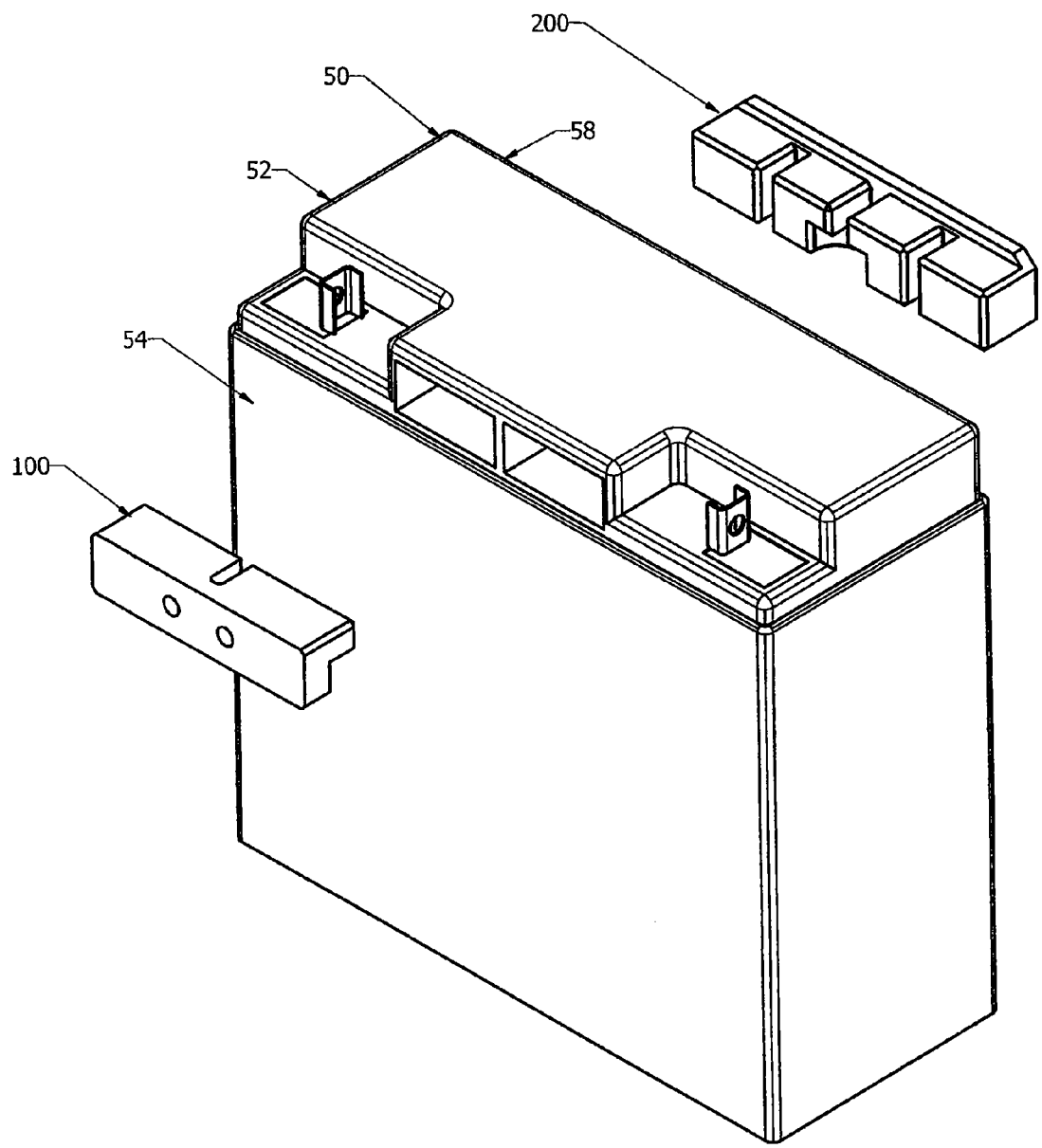
FIG. 9 is a perspective view of each of the embodiments of FIGS. 1-4 and FIGS. 5-8 being inserted into a battery.

Referring to FIG. 9, battery mount 100 is inserted into top portion 52 of a battery 50. The terminal side 54 of battery 50 includes handle 56 into which battery mount 100 is inserted.

Referring now to FIGS. 5-8, a second embodiment of a universal battery mount 200 according to the present invention is shown. Similar to battery mount 100, battery mount 200 may be used to mount several different types of twelve volt sealed lead acid batteries, such as are listed above with respect to battery mount 100. While battery mount 100 is used to engage terminal side 54 of battery 50, as shown in FIG. 9, battery mount 200 is used to engage a non-terminal side 58 of battery 50. Battery mount 200 may be constructed from the same material as battery mount 100.

Battery mount 200 has a generally rectangular hexahedron shaped body 201, with a lateral axis LA bisecting battery mount 200 into mirror images on either side of lateral axis LA, and a longitudinal axis LO that bisects battery mount 200 into two separate longitudinal portions. All edges of body 201 may be chamfered as shown in the drawings. A central groove 202 optionally extends along lateral axis LA and extends from a top surface 204 through battery mount 100, and ends prior to extending completely through body 201. An additional lateral groove 203 extends parallel to and on either side of lateral axis LA, about halfway between lateral axis LA and a lateral surface 214 of body 201.

Figure 10:
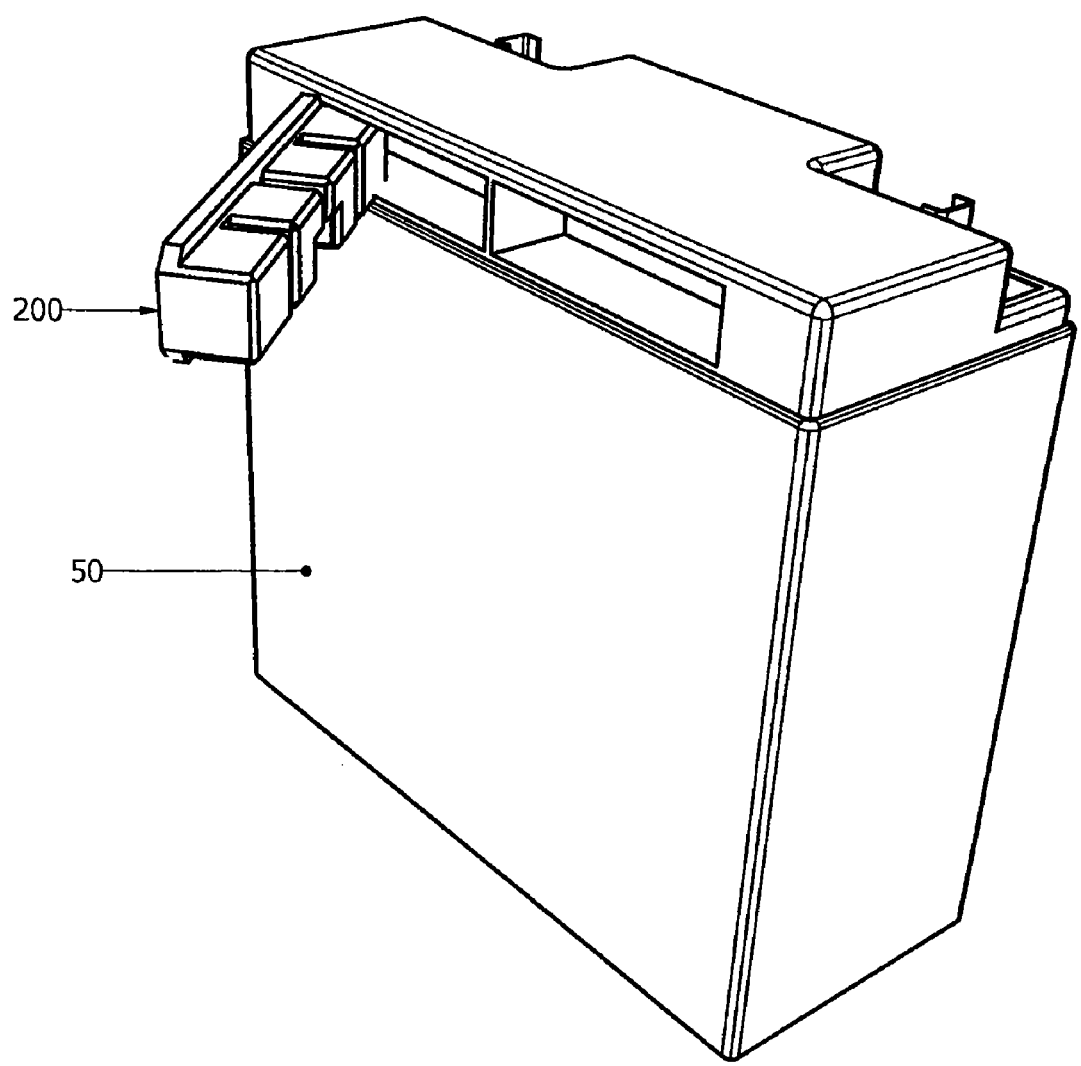
FIG. 10 is a perspective view showing the coupling of the battery mount of FIGS. 5-8 to a battery.

Battery mount 200 also includes an arcuate cut-out 210 that extends on a first side 212 of longitudinal axis LO. Arcuate cut-out 210 allows battery mount 200 to be used both with batteries that require arcuate cut-out 210 in battery mount 200 in order to allow the battery mount 100 to be coupled to the battery, as well as batteries that do not require arcuate cut-out 210 in battery mount 200 in order to allow the battery mount 200 to be coupled to the battery. An example of a battery 50 that requires arcuate cut-out 210 in order to allow the battery mount 100 to be coupled to battery 50 is shown in FIG. 10.

Arcuate cut-out 210 is adjacent to and begins at groove 202 about halfway between top surface 204 and bottom surface 206. Arcuate cut-out 110 extends to top surface 204 about halfway between lateral axis LA and groove 203.

Bolts 60 may be molded into body 201 between groove 203 and lateral surface 214 such that the threaded portion 62 of bolts 60 extend outwardly from bottom surface 206 of body 201. Alternatively, retaining bolt cut-outs (not shown), similar to those formed in battery mount 100, may be formed in body 201 between groove 203 and lateral surface 214.

Battery mounts 100, 200 may be provided together as a kit, although, typically, only one battery mount 100, 200 will be used in a particular application. Battery mount 200 only will be discussed, although the ensuing description pertains to battery mount 100 as well.

Figure 11:
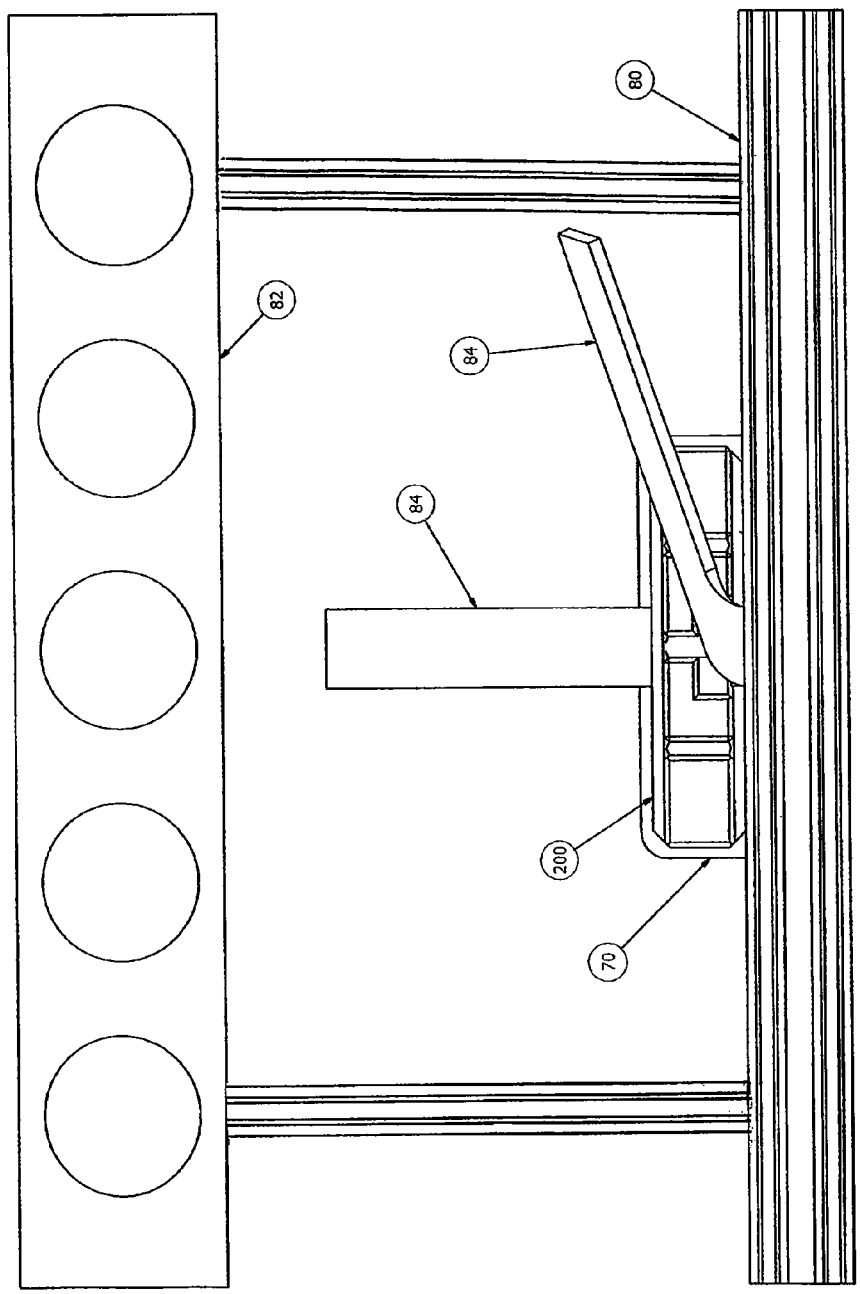
FIG. 11 is a top plan view of the universal battery mount of FIGS. 5-8 installed on the chassis of a vehicle.

Referring to FIG. 11, battery mount 200 is fixedly mounted to a support bracket 70, such as by bolts 60 (not shown). Support bracket 70 is fixedly mounted to a first chassis portion 80 such that non-terminal side of battery 50 (not shown in FIG. 11) may be disposed on battery mount 200 such that battery mount 200 engages battery 50 to prevent lateral and longitudinal displacement of battery 50 with respect to first chassis portion 80. Battery 50 is also supported by a second chassis portion 82 to distribute the weight of battery 50. A securement device, such as a hook-and-loop strap 84, may be wrapped around battery 50, securing battery 50 against vertical movement with respect to chassis portions 80, 82.

In the event that battery 50 needs to be replaced with a battery from a different manufacturer, hook-and-loop strap 84 is removed from around battery 50, and battery 50 is lifted from battery mount 200 and second chassis portion 82. Replacement battery is placed over battery mount 200 and chassis portion 82. Replacement battery is then secured to battery mount 200 and chassis portions 80, 82 with hook-and-loop strap 84.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A battery mount comprising a body having:
   a short side;
   a long side;
   a top surface;
   a bottom surface;
   a lateral axis bisecting the long side of the body;
   and a cut-out extending from the top surface to a second location between the top surface and the bottom surface on either side of the lateral axis, wherein the body on a first side of the lateral axis is a mirror image of the body on a second side of the lateral axis; and a longitudinal axis bisecting the body, wherein the cut-out extends along one side of the longitudinal axis.

2. The battery mount according to claim 1, further comprising a lateral groove extending parallel to and on either side of the lateral axis and extending the length of the short side.

3. The battery mount according to claim 1, wherein the body comprises a hole extending through the top surface of the body between the central groove and the cut-out.

4. The battery mount according to claim 1, wherein the body has a generally hexahedron shape.

5. The battery mount according to claim 1, further comprising a groove extending along the lateral axis.

6. A battery mount comprising a body having:
   a short side;
   a first long side;
   a second long side;
   a top surface;
   a bottom surface;

a longitudinal axis extending generally parallel to the first and second long sides, the longitudinal axis bisecting the short side of the body;

a lateral axis extending perpendicular to the longitudinal axis, wherein the body on a first side of the lateral axis is a mirror image of the body on a second side of the lateral axis; and an arcuate cut-out extending from the top surface to a location between the top surface and the bottom surface of the body and extending along one side of the longitudinal axis from the longitudinal side toward the longitudinal side axis.

7. The battery mount according to claim 6, wherein the arcuate cutout is bisected by the lateral axis.

8. The battery mount according to claim 6, further comprising a central groove extending along the lateral axis, wherein the arcuate cut-out is extends away from the central groove.

9. The battery mount according to claim 8, wherein the body comprises a hole extending through the top surface of the body between the central groove and the arcuate cut-out.

10. The battery mount according to claim 6, wherein the body comprises a bottom surface and the arcuate cut-out extends from the top surface to a location between the top surface and the bottom surface.

11. The battery mount according to claim 6, wherein the body has a generally hexahedron shape.

12. The battery mount according to claim 6, further comprising a lateral groove extending generally perpendicular to the longitudinal axis and through the first and second long sides, the lateral groove extending the length of the short side and being located between the lateral axis and the short side.

13. A battery mount kit comprising:
a first battery mount comprising a first body having:
a short side;
a long side;
a top surface;
a bottom surface;
a lateral axis bisecting the long side of the first body;
a longitudinal axis bisecting short side of the first body;
the long side extending parallel to the longitudinal axis;
a central groove extending along the lateral axis, the central groove extending from the top surface to a first location between the top surface and the bottom surface;
a plurality of arcuate cut-outs extending from the top surface of the first body on either side of the lateral axis to the central groove and along one side of the longitudinal axis between the long side and the longitudinal axis; and
a lateral groove extending parallel to and on either side of the central groove,
wherein the first body on a first side of the lateral axis is a mirror image of the first body on a second side of the lateral axis; and
a second battery mount comprising a second body having:
a short side;
a long side;
a top surface;
a bottom surface;
a lateral axis bisecting the long side of the second body;
a first end parallel to the lateral axis;
a second end parallel to the lateral axis;
a longitudinal axis bisecting the short side of the second body;
the long side extending between the first end and the second end and extending parallel to the longitudinal axis; and
a plurality of arcuate cut-outs extending from the top surface of the second body to a second location between the top surface and the bottom surface of the second body on either side of the lateral axis, wherein the each of the plurality of arcuate cut-outs extends along one side of the longitudinal axis away from the lateral axis to one of the first and second ends and extends between the longitudinal axis and the long side,
wherein the body on a first side of the lateral axis is a mirror image of the body on a second side of the lateral axis.

14. The battery mount kit according to claim 13, wherein the first battery mount is adapted for installation on a first side of a battery and wherein the second battery mount is adapted for installation on a second side of the battery.

* * * * *